United States Patent [19]

Stoltz et al.

[11] 4,128,078
[45] Dec. 5, 1978

[54] APPARATUS FOR APPLYING POWDERED COATING MATERIALS TO THE OUTER PERIPHERY OF OBJECTS

[76] Inventors: Woodrow W. Stoltz; Charles R. Thatcher, both of P.O. Box 35103, Tulsa, Okla. 74135

[21] Appl. No.: 815,905

[22] Filed: Jul. 15, 1977

[51] Int. Cl.$^2$ .............................................. B05C 19/00
[52] U.S. Cl. .................................... 118/603; 118/312; 118/316; 118/DIG. 11
[58] Field of Search ............... 118/312, 309, 634, 308, 118/DIG. 11, 316, 603; 302/57

[56] References Cited

U.S. PATENT DOCUMENTS

| | | | |
|---|---|---|---|
| 2,770,212 | 11/1956 | Marantz | 118/312 X |
| 3,291,630 | 12/1966 | Deyle et al. | 118/312 X |
| 3,439,649 | 4/1969 | Probst et al. | 118/634 |
| 3,592,676 | 7/1971 | From, Jr. et al. | 118/312 X |
| 3,791,341 | 2/1974 | Diamond et al. | 118/310 X |

*Primary Examiner*—John P. McIntosh
*Attorney, Agent, or Firm*—Head, Johnson & Chafin

[57] ABSTRACT

Apparatus for applying powdered coating materials to the outer periphery of objects, and particularly tubular objects, and which comprises a support frame structure for receiving the object therethrough and partially surrounding the object in spaced relation thereto, a supply chamber for receiving a supply of new powdered coating materials therein and in communication with fluidizer apparatus for directing the new powder thereto, gun batteries in communication with the fluidizer apparatus for directing the fluidized powder onto the outer periphery of the object simultaneously from opposite sides thereof, filtered chambers for collecting powder overspray and directing any accumulation of overspray into a reclaimed powder reservoir, said reclaimed powder reservoir being in communication with the fluidizer apparatus for adding the reclaimed powder thereto whereby reclaimed powder is directed to the outer periphery of the object.

6 Claims, 4 Drawing Figures

APPARATUS FOR APPLYING POWDERED COATING MATERIALS TO THE OUTER PERIPHERY OF OBJECTS

CROSS REFERENCE TO RELATED APPLICATIONS

This application is related to co-pending applications entitled "Pipe Coating System", Ser. No. 815,910, filed July 15, 1978, "Telescoping Vehicles", Ser. No. 820,581, filed Aug. 1, 1977, and "Canted Roller Apparatus for Moving Objects", Ser. No. 815,907, filed July 15, 1977, of which I am an inventor or co-inventor.

BACKGROUND OF THE INVENTION

1. Field of the Invention

This invention relates to improvements in apparatus for coating objects, and more particularly, but not by way of limitation, to an apparatus for coating the outer periphery of tubular objects with powdered coating materials.

2. Description of the Prior Art

It is well known that steel or metallic pipes and the like, whether disposed above ground or underground, are subject to a great amount of corrosion or other damage from the elements surrounding the pipe. In order to reduce damage to the metallic material of the pipe, the outer periphery of the pipe is frequently coated with a suitable material which resits the erosive effects of the surrounding elements. One particular coating material in widespread use is a powdered material which is usually applied to the pipe by an electrostatic coating method, such as that shown in the Probst et al. U.S. Pat. No. 3,439,649. There are certain disadvantages in the application of the dry or powdered materials, however, in that there is frequently a great amount of overspray, which results in a wastage of material, and it is frequently difficult to provide a substantial uniform coating over the entire outer periphery of the pipe.

SUMMARY OF THE INVENTION

The present invention contemplates a novel apparatus for applying dry or powdered material to the outer periphery of objects, and particularly tubular objects, such as pipe sections, in a manner particularly designed for overcoming the foregoing disadvantages. The novel apparatus comprises a main frame or housing having a pass-through whereby the pipe section may be moved therethrough in a longitudinal direction during the application of the coating material to the outer periphery thereof. A supply reservoir is provided for the apparatus for receiving a supply of new powder prior to the application of the powder on the pipe. The supply reservoir is in communication with fluidizer means for conveying the new powder to the fluidizer where the powder is fluidized in the usual or well-known manner in preparation for application to the outer periphery of the pipe. A plurality of spray guns are mounted on the housing and directed toward the opposite sides of the pipe. The fluidized powder is conveyed from the fluidizer means to the gun batteries whereby the powder is sprayed onto the opposite sides of the longitudinally moving pipe. (As set forth in the aforementioned co-pending application, "Pipe Coating System", Ser. No. 815,910 it is preferable that the pipe be rotated about its own longitudinal axis simultaneously with the longitudinal movement thereof.) Filtered chamber means is provided in the lower portion of the frame or housing means for capturing or retrieving substantially any overspray. The filtered chamber means is in communication with a reclaimed powder chamber for delivering the retrieved overspray thereto. The reclaimed powder chamber is in communication with the fluidizing means for directing the filtered reclaimed powder thereto in order that the reclaimed powder may be applied to the outer periphery of the pipe during the coating operation. The novel coating apparatus is simple and efficient in operation and economical and durable in construction.

DESCRIPTION OF THE PREFERRED EMBODIMENT

Figure 1:
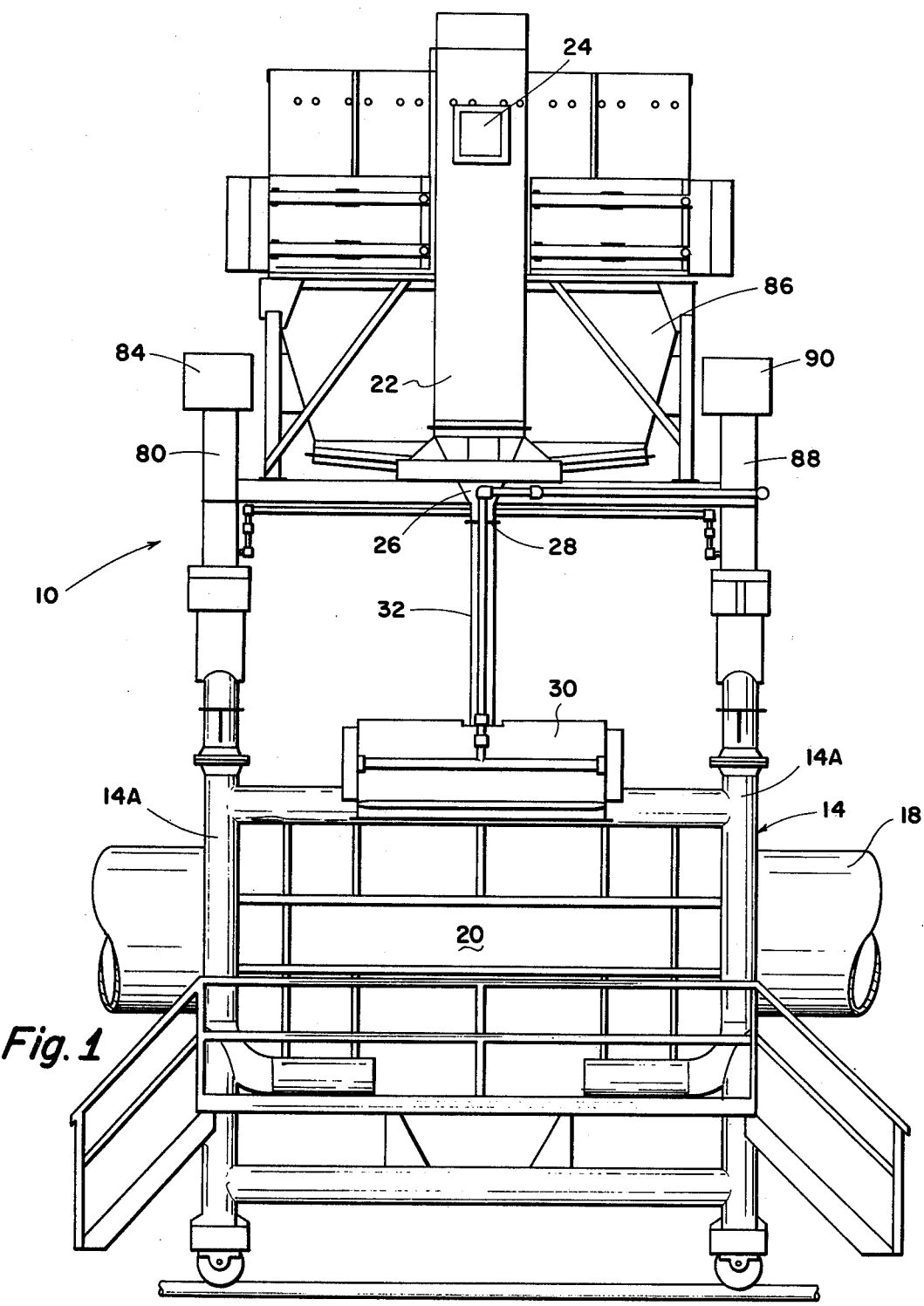
FIG. 1 is a side elevational view of a coating apparatus embodying the invention.

Referring to the drawings in detail, reference character 10 generally indicates a coating apparatus comprising a substantially arch-shaped main framework 14 constructed from hollow tubes, or the like, for a purpose as will be hereinafter set forth. The forward and rearward ends of the framework 14 are generally open as shown at 16 in FIG. 2 whereby a pipe section 18 may be moved in a longitudinal direction therethrough. The opposite sides of the framework 14 are preferably closed as shown at 20 for trapping substantially all of the powdered material within the housing or framework 14 during a spray coating operation.

Figure 3:
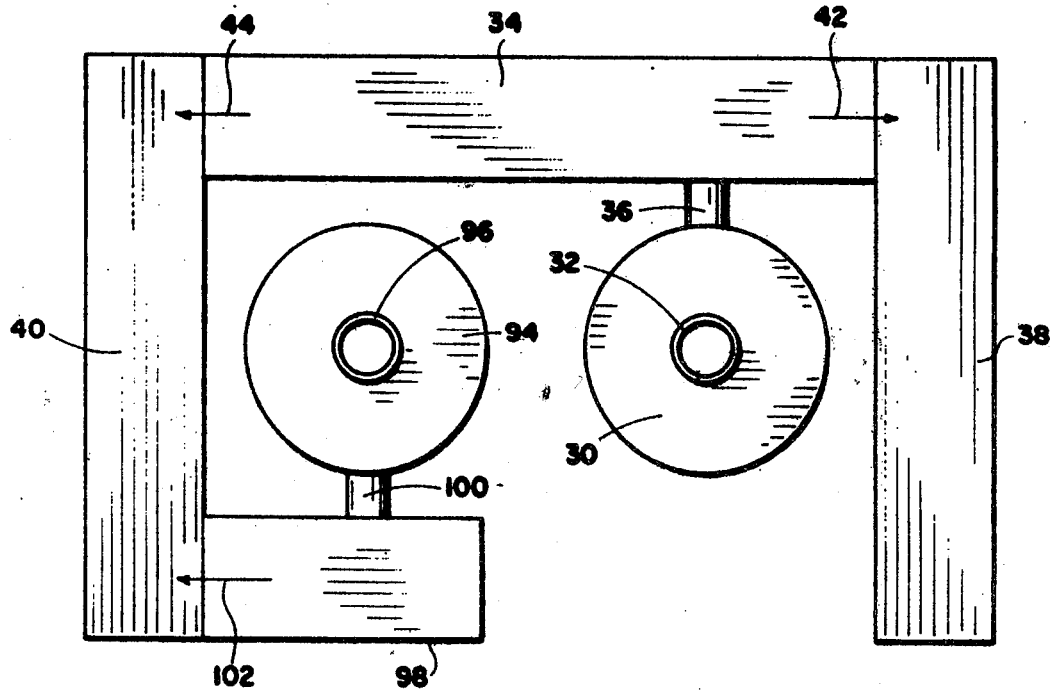
FIG. 3 is a top view of a portion of a coating apparatus embodying the invention.

A first supply reservoir 22 is mounted on the framework 14, preferably in the upper portion thereof as shown in the drawings, but not limited thereto, and is in communication with a suitable source of powdered coating material (not shown) through an inlet port 24 whereby new powdered material may be directed into the reservoir 22 by suitable pumping means (not shown) as is well known. The lower end of the reservoir 22 is preferably provided with a substantially conical shaped discharge housing 26 having an outlet port 28 in communication with a suitable screen assembly 30 through a conduit 32. The screen assembly 30, in turn, is in communication with a suitable fluidizer 34 through suitable conduit means 36 (FIG. 3). The new powder is directed from the supply reservoir 22 into the screen assembly where the powder is filtered to remove any dust and large particles therefrom. The cleaned and filtered new powder then moves from the screen assembly 30 into the fluidizer 34 where it is fluidized, as is well known.

The first fluidizer 34 is in open communication with a second fluidizer 38 and a third fluidizer 40, and the powder entering the fluidizer 34 moves in the directions indicated by the arrows 42 and 44 for distribution into the fluidizers 38 and 40. The fluidizer 38 is operably connected with a plurality or battery of spray guns 46 through suitable hoses or conduits 48, as is well known, and the gun batteries 46 are suitably mounted within the housing or framework 14 in such a manner that the spray pattern therefrom is directed toward one side of the pipe 18 moving through the apparatus 10, as will be hereinafter set forth in detail. The fluidizer 40 is similarly operably connected with a second battery of spray guns 50 through suitable hoses 52, and the gun batteries 50 are suitably mounted in the housing or framework 14 whereby the spray pattern therefrom is directed toward the opposite side of the pipe 18.

A pair of opposite disposed inwardly directed ledges 54 and 56 are provided on the framework or housing 14 and are spaced slightly above the floor or ground level, but in the proximity of the lower portion of the framework for closing a portion of the bottom of the central spray chamber 58 contained within the housing 14. A hiatus 60 is provided between the inwardly disposed edges of the ledges 54 and 56 to provide clearance for the pipe supporting vehicles (not shown) normally utilized for moving the pipe 18 through the apparatus 10, as particularly set forth in the aforementioned co-pending applications.

Figure 4:
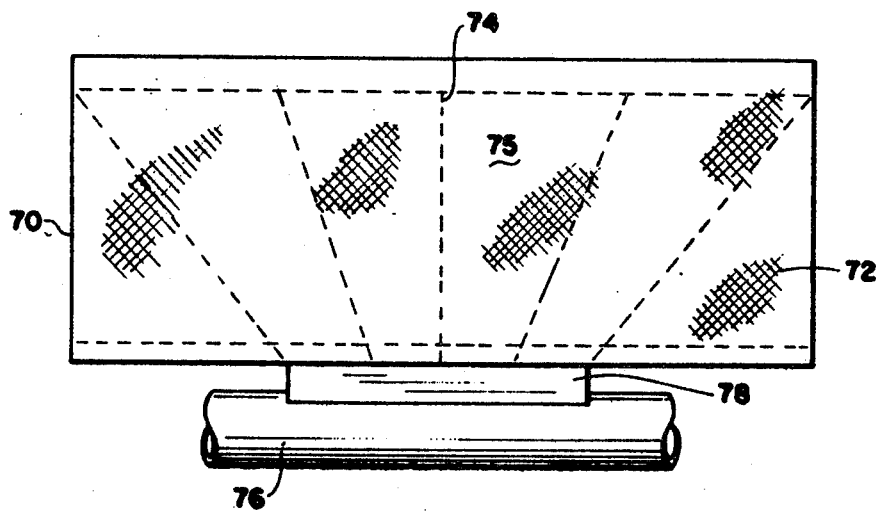
FIG. 4 is a top view of a filtered chamber utilized in the invention.

A pair of substantially identical, but opposite disposed, filtered chambers generally indicated at 62 and 64 are pivotally secured to the ledges 54 and 56, respectively, as shown at 66 and 68. Whereas the filtered chambers 62 and 64 may be of any suitable type, as shown herein, particularly in FIG. 4, the chambers preferably comprise a substantially box-shaped main housing 70 having a lower end closed by a plate member 72 comprised of a plurality of angularly disposed sections as indicated in broken lines in FIG. 4 whereby the transverse centerline 74 thereof is of a substantially V-shaped cross-sectional configuration for facilitating any amassing of the captured overspray powder within the V-shaped trough. A suitable filter 75, preferably constructed of cloths, is disposed over the open end of the box 70.

The central portion of the box 72 is in open communication with a pipe member 76 through a suitable closed passageway 78 whereby any contents of the box 72 may be readily directed into the interior of the pipe 76. The pipe 76 is carried by the framework 14 and is in open communication with the tubular upright members 14A thereof. The upper ends of the forwardly disposed transversely spaced pair of upright pipes 14A are in open communication with a pair of angularly disposed pipes 80 and 82 which terminate at their outer ends in a connection member 84 which is in open communication with the interior of a reclaimed powder reservoir 86 provided in the upper portions of the framework 14 and in spaced relation with respect to the new powder reservoir 22. Similarly, the upper ends of the rearwardly disposed transversely spaced pipes 14A are in open communication with a pair of angularly disposed pipes 88 (only one of which is shown in FIG. 1) which terminate at their outer ends in a connection member 90 which is in open communication with the interior of the reclaimed powder reservoir 86.

The lower end 92 of the reservoir 86 is preferably inwardly tapered or substantially conical in configuration and is provided with a discharge port 92 which is in communication with a second screen assembly 94 through suitable conduit means 96. The screen assembly 94 is substantially identical with the screen assembly 30 and is in communication with a fourth fluidizer 98 (FIG. 3) through a suitable conduit 100. The fluidizer 98 is in open communication with the fluidizer 40, and material from the fluidizer 98 flows into the fluidizer 40 in the direction indicated by the arrow 102 for a purpose and in a manner as will be hereinafter set forth.

In operation, the pipe section 18 is passed through the apparatus 10 in a combined longitudinal and rotational movement in any suitable manner, as set forth in the aforementioned co-pending applications. As the leading end of the pipe section 18 enters a chamber 58, suitable switching mechanism (not shown) is energized for initiating the operation of the apparatus 10 whereby the powdered coating material will be directed against the outer periphery of the pipe 18 and not to the end support members (not shown) supporting the pipe on the conveying vehicles (not shown). Of course, the powder particles may be charged electrostatically in any suitable manner (not shown) and deposited on the pipe 18 under the influence of an electrostatic field extending the length of the pipe, as is well known in the art. The manner in which the powder is directed to the outer periphery of the pipe 18 by the apparatus 10 is the important feature of the present invention.

The new powder (not shown) to be deposited in the new powder chamber 22 may be pumped from a suitable supply source (not shown) in the usual manner for providing the desired quantity of new powder for the reservoir 22. The new powder is directed from the reservoir 22 to and through the screen apparatus 30 in the usual manner, and the screen apparatus 30 functions for filtering the incoming powder for removal of any dirt and oversized particles. The cleaned and filtered powder leaves the screen 30 and is directed into the fluidizer 34 where the particles are fluidized, or suspended in air as is well known. The fluidized powder flows from the first fluidizer 34 into the fluidizers 38 and 40 in the direction indicated by the arrows 42 and 44. The fluidized powder leaves the fluidizers 38 and 40 through the conduits 48 and 52, respectively, and is directed to gun batteries 46 and 50 in the usual or well-known manner.

Figure 2:
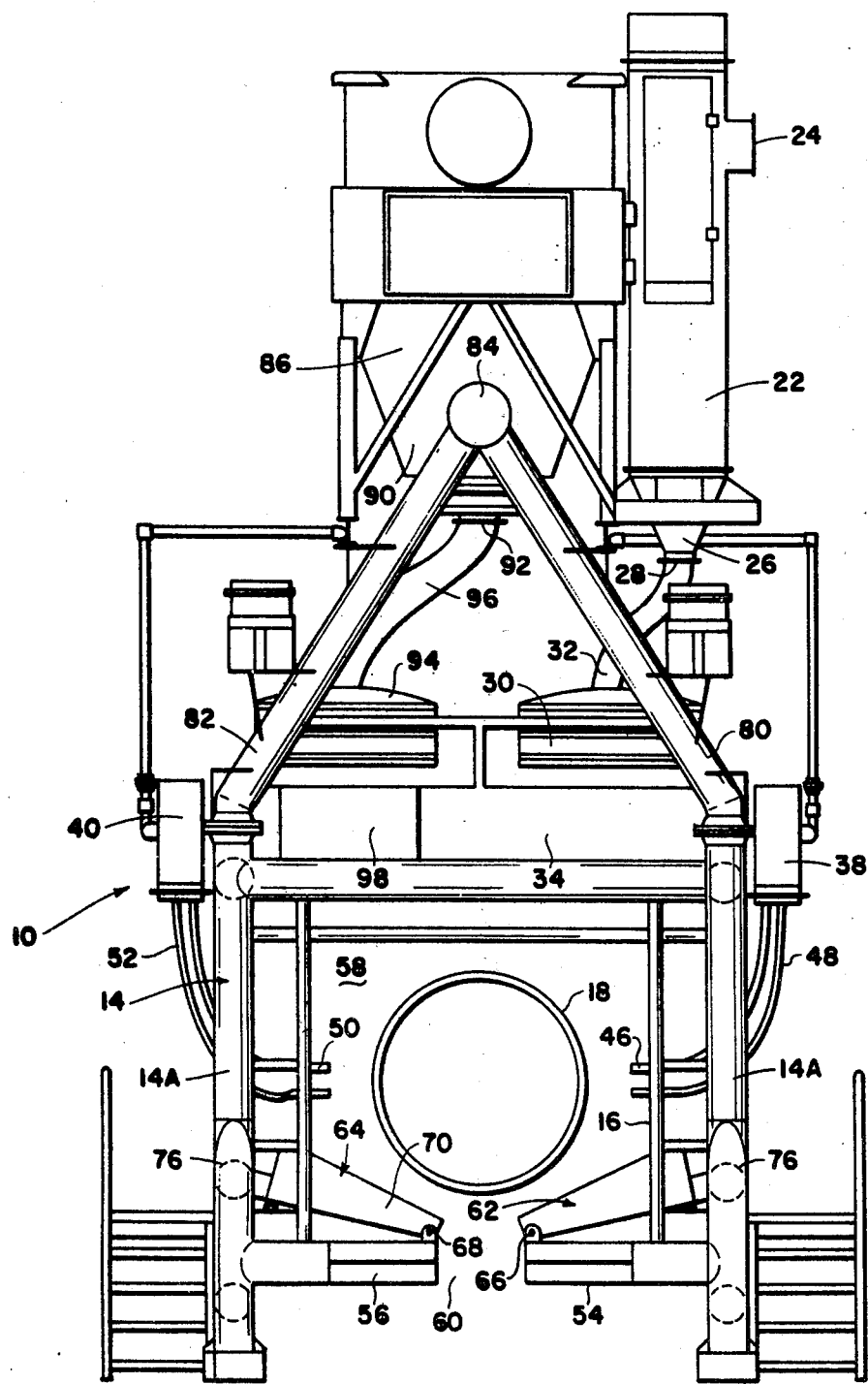
FIG. 2 is an end elevational view of a coating apparatus embodying the invention.

The gun batteries 46 and 50 are disposed on opposite sides of the pipe 18, as clearly shown in FIG. 2, and direct the powdered material in a spray pattern simultaneously against the outer periphery of the opposite sides of the pipe. The combined longitudinal and rotational movement of the pipe passing through the chamber 58 and between the gun batteries 46 and 52 assures a thorough and even distribution of the coating material thereon. As soon as the following or rear end of the pipe section 18 enters the chamber 58, the guns in the proximity of the end of the pipe are de-energized in any well-known manner whereby the supporting structure supporting the pipe from the conveying vehicle will not be sprayed with the coating material.

During the spraying operation, a quantity of the powdered material will not be applied to the outer periphery of the pipe 18. This powder is normally called overspray and falls by gravity downwardly in the chamber 58. The downwardly falling powder is captured on the filter 75 and moves therethrough by gravity into the interior of the box 72. The captured, filtered powder is drawn out of the box 72 and into the pipe 76 through the passageway 78. It is preferable to provide a vacuum within the pipe 76 and in the pipes 14A and 80, 84, and 88, as is well known, whereby the captured powder will be drawn into the interior of the reclaimed powder chamber 86. The reclaimed powder has been filtered by the filter 75 for removal of substantially all dirt and oversize particles and is conditioned for reuse in the spraying operation. The reclaimed powder is moved from the reclaimed powder reservoir 86 to the fluidizer 98 and into the fluidizer 40 whereupon the reclaimed powder is sprayed onto the outer periphery of the pipe 18 through the gun batteries 50. Of course, depending upon the quantity of new powder present within the fluidizers 40, 34 and 38, the reclaimed powder may be drawn into all three fluidizers for mixing with the new powder being sprayed from both gun batteries 50 and 46. In any event, the use of the reclaimed powder is a great saving in expense and a great reduction in waste of the powdered coating material.

From the foregoing, it will be apparent that the present invention provides a novel apparatus for applying powdered coating materials to the outer periphery of the pipe section in an economical and efficient manner. The powder is directed simultaneously against the outer periphery of the opposite sides of the pipe for assuring an efficient and thorough coating thereof, particularly in combination with the combined longitudinal and rotational movement of the pipe section passing through the apparatus. In addition, substantially all overspray is captured for reclaiming and is filtered for reuse along with the new powder in the coating operation. The novel spraying apparatus greatly reduces the overall cost of the coating operation and reduces waste of the coating materials.

Whereas the present invention has been described in particular relation to the drawings attached hereto, it should be understood that other and further modifications, apart from those shown or suggested herein, may be made within the spirit and scope of this invention.

What is claimed is:

1. Apparatus for applying powdered coating materials to the outer periphery of objects and comprising main framework means having an internal spraying chamber for receiving the object therethrough, gun battery means carried by said framework means and arranged for directing a spray pattern in a direction toward the object within the spraying chamber, new powder reservoir means carried by said framework means for receiving a supply of new powdered coating material therein, fluidizing means in communication with the new powder reservoir means for receiving the new powder therefrom, means operably connecting said fluidizing means with said gun battery means for directing the fluidized powder to the gun battery means for spraying thereof onto the outer periphery of the object, filtered overspray capturing chamber means carried by said framework means for retrieving powder overspray during a spraying operation, reclaimed powder reservoir means in communication with said overspray capturing chamber means for receiving the reclaimed powder therefrom, second fluidizing means in communication with said reclaimed powder reservoir for receiving the reclaimed powder therefrom, said second fluidizing means being in communication with the first-mentioned fluidizing means for directing the reclaimed powder therefor for application of the reclaimed powder to the outer periphery of the object.

2. Apparatus as set forth in claim 1 and including first screen assembly means interposed between the new powder reservoir means and the first-mentioned fluidizing means for cleaning and filtering the new powder prior to disposition thereof in the first fluidizing means.

3. Apparatus as set forth in claim 2 and including second screen assembly means interposed between the reclaimed powder reservoir means and the second fluidizing means for cleaning and filtering the reclaimed powder prior to disposition thereof in the second fluidizing means.

4. Apparatus as set forth in claim 1 wherein the gun battery means comprises a first gun battery assembly disposed in spaced relation from one side of the object for spraying the powdered coating material against said one side, and a second gun battery assembly disposed in spaced relation from the opposite side of the object for spraying the powdered coating material on the opposite side of the object simultaneously with the spraying of the said one side of the object.

5. Apparatus as set forth in claim 1 wherein the filtered overspray capturing chamber means comprises substantially box-shaped chamber means having an open upper end for receiving the powder overspray therein, and filter cloth means disposed over said open upper end for filtering the powder overspray prior to entrance into the box-shaped chamber means.

6. Apparatus as set forth in claim 1 wherein the framework means includes tubular members having internal passageways for providing said communication between the reclaimed powder reservoir means and the overspray capturing chamber means.

* * * * *